US011040700B2

(12) United States Patent
An et al.

(10) Patent No.: US 11,040,700 B2
(45) Date of Patent: Jun. 22, 2021

(54) APPARATUS FOR MANAGING VEHICLE INTRUSION, SYSTEM HAVING THE SAME AND METHOD THEREOF

(71) Applicants: Hyundai Motor Company, Seoul (KR); KIA Motors Corporation, Seoul (KR)

(72) Inventors: Dae Yun An, Anyang-si (KR); Eung Hwan Kim, Seoul (KR); Gyun Ha Kim, Incheon (KR); Seul Ki Jeon, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/656,972

(22) Filed: Oct. 18, 2019

(65) Prior Publication Data
US 2020/0189522 A1 Jun. 18, 2020

(30) Foreign Application Priority Data
Dec. 13, 2018 (KR) .................. 10-2018-0160988

(51) Int. Cl.
| B60R 25/31 | (2013.01) |
| B60R 25/102 | (2013.01) |
| B60R 25/104 | (2013.01) |
| B60R 25/30 | (2013.01) |
| G06K 9/00 | (2006.01) |
| H04W 4/12 | (2009.01) |
| B60Q 1/52 | (2006.01) |
| B60R 25/34 | (2013.01) |
| B60R 25/10 | (2013.01) |

(52) U.S. Cl.
CPC ............ *B60R 25/31* (2013.01); *B60R 25/102* (2013.01); *B60R 25/104* (2013.01); *B60R 25/305* (2013.01); *B60R 25/34* (2013.01); *G06K 9/00838* (2013.01); *H04W 4/12* (2013.01); *B60Q 1/52* (2013.01); *B60R 2025/1013* (2013.01)

(58) Field of Classification Search
CPC ..... B60R 25/31; B60R 25/102; B60R 25/104; B60R 25/305; B60R 25/34; B60R 2025/1013; G06K 9/00838; H04W 4/12
USPC .......................................... 455/466
See application file for complete search history.

(56) References Cited

U.S. PATENT DOCUMENTS

2004/0140885 A1* 7/2004 Slicker .................. B60R 25/305
340/426.1
2004/0235516 A1* 11/2004 Otsuki .................... H04L 43/06
455/552.1

(Continued)

Primary Examiner — William Nealon
(74) Attorney, Agent, or Firm — Brinks Gilson & Lione

(57) ABSTRACT

The present disclosure provides an apparatus for managing a vehicle intrusion, a system having the same, and a method thereof. The apparatus for managing a vehicle intrusion includes a processor that determines presence of an occupant who intrudes into a vehicle and notifies a user of the presence of the occupant who intrudes into the vehicle, and storage that stores a result of detecting the presence of the occupant obtained by the processor. Accordingly, it is possible to detect whether an intruder who intrudes into a vehicle before, after or while a user gets in the vehicle is present and inform the user of the fact, thereby assuring safety of the user and safety of the vehicle.

19 Claims, 20 Drawing Sheets

(56) References Cited

U.S. PATENT DOCUMENTS

| | | | | |
|---|---|---|---|---|
| 2005/0162260 A1* | 7/2005 | Gupte | ................ | B60R 25/1004 |
| | | | | 340/426.18 |
| 2014/0306799 A1* | 10/2014 | Ricci | ....................... | H04W 4/12 |
| | | | | 340/5.83 |
| 2018/0056940 A1* | 3/2018 | Etonye | ............... | G06K 9/00832 |
| 2019/0147262 A1* | 5/2019 | Kuehnle | ............... | B60W 40/09 |
| | | | | 340/439 |

* cited by examiner

LAMP OPERATION BASED ON
VEHICLE SETTING/LOCATION/VEHICLE

VEHICLE LAMP CONTROL CORRESPONDING
TO LOCATION OF INTRUDER
EX.) LOCATION OF INTRUDER (LEFT)
-> LEFT LAMP CONTROL

APPARATUS FOR MANAGING VEHICLE INTRUSION, SYSTEM HAVING THE SAME AND METHOD THEREOF

CROSS-REFERENCE TO RELATED APPLICATION

This application claims priority to and the benefit of Korean Patent Application No. 10-2018-0160988, filed on Dec. 13, 2018, which is incorporated herein by reference in its entirety.

FIELD

The present disclosure relates to an apparatus for managing a vehicle intrusion, a system having the same, and a method thereof.

BACKGROUND

The statements in this section merely provide background information related to the present disclosure and may not constitute prior art.

In general, an intrusion detection device is installed in a vehicle to inhibit theft of the vehicle and the articles in the vehicle. Conventionally, the intrusion detection device uses an ultrasonic sensor, an infrared sensor, or the like.

However, since the conventional intrusion detection device focuses only on detecting an unauthorized occupant who intrudes into the vehicle at a time when the user is not present, we have discovered that a dangerous situation may occur when a user gets in the vehicle while an unauthorized occupant is present in the vehicle.

Thus, we have discovered a need for not only detecting an occupant who intrudes into a vehicle, but also promptly and accurately informing a user of information about the unauthorized occupant who intrudes into the vehicle immediately before or while the user gets in the vehicle.

The above information disclosed in this Background section is only for enhancement of understanding of the background of the present disclosure, and therefore it may contain information that does not form the prior art that is already known to a person of ordinary skill in the art.

SUMMARY

The present disclosure provides an apparatus for managing a vehicle intrusion, which is capable of detecting whether an intruder who intrudes into a vehicle before, after or while a user gets in the vehicle is present and informing the user of the fact, a system having the same, and a method thereof.

According to an aspect of the present disclosure, an apparatus for managing a vehicle intrusion includes a processor that determines presence of an occupant who intrudes into a vehicle sensed by a sensing module and notifies a user of the presence of the occupant who intrudes into the vehicle, and storage that stores a result of detecting the presence of the occupant obtained by the processor.

The apparatus may further include a communication device that is controlled by the processor and transmit a notification text to a user terminal of the user when the processor determines that the occupant who intrudes into the vehicle is present before the user gets in the vehicle.

The apparatus may further include a display that is controlled by the processor and output a notification screen when the processor determines that the occupant who intrudes into the vehicle after the user gets in the vehicle exists.

The display may display whether the occupant who intrudes into the vehicle exists together with in-vehicle location information of the occupant who intrudes into the vehicle.

The processor may control an external lamp or a horn of the vehicle to perform a notification to the user when the presence of the occupant who intrudes into the vehicle before the user gets in the vehicle is detected.

The processor may control the external lamps to illuminate in one direction based on a location of the occupant who intrudes into the vehicle.

The processor may control the external lamp of the vehicle to be lightened on at a bright intensity or to be flickered or turned on or off in a preset pattern when the user is away from the vehicle by a preset distance or more, when an ambient light exists, or when the vehicle is located at an outdoor place.

The processor may control the external lamp of the vehicle to be turned on at a dark intensity or to be flickered or turned on or off in a preset pattern when the user is located within a preset distance from the vehicle, when an ambient light is dark, or when the vehicle is located at an indoor place.

The external lamp may include at least one of a head lamp, a fog light, a tail light, a brake light, an emergency light, a room lamp, a daytime headlight, a welcome lamp, and a vehicle side light.

The processor may inform the user by using at least one of an in-vehicle mood lamp, the display, and seat vibration when the intrusion of the occupant occurs after the user gets in the vehicle.

The processor may inform of whether the occupant who intrudes into the vehicle is present or a location of the occupant as a lighting position or lighting color of the in-vehicle mood lamp, display whether the occupant who intrudes into the vehicle is present or the location of the occupant on the display to inform the user, or inform of whether the occupant who intrudes into the vehicle exists or the location of the occupant as a vibration position or vibration intensity of a seat of the user.

The processor may sense a change in a location of the occupant after a door is opened to determine whether the occupant who intrudes into the vehicle is present.

The processor may register information about a person in the storage in advance, compare image information or volumetric information obtained by photographing an occupant who sits on a rear seat of the vehicle with information about the person registered in advance to perform a notification to the user when the image information or volumetric information does not correspond to the information about the person registered in advance.

The processor may perform a notification to the user when a number of occupants sitting on the rear seat of the vehicle is greater than or less than a number of persons stored in advance.

According to another aspect of the present disclosure, a system for managing a vehicle intrusion includes a sensing module that senses presence of an occupant who intrudes into a vehicle, a vehicle intrusion management apparatus that determines the presence of the occupant who intrudes into the vehicle based on a sensing result of the sensing module and informs a user of the presence of the occupant who intrudes into the vehicle, and a user terminal that receives a notification text indicating the presence of the occupant who intrudes into the vehicle from the vehicle intrusion management apparatus when the presence of the occupant who intrudes into the vehicle before the user gets in the vehicle is determined.

The user terminal may display at least one piece of information about whether the occupant who intrudes into the vehicle is present, position information of the occupant who intrudes into the vehicle, and a number of occupants on a screen, and output at least one of sound, vibration, and lamp.

The user terminal may include at least one state indicating lamp, and the user terminal may control whether to turn on the at least one state indicating lamp or a flickering pattern of the at least one state indicating lamp to indicate the at least one piece of information about whether the occupant who intrudes into the vehicle is present, the position information of the occupant who intrudes into the vehicle, and the number of occupants.

The sensing module may include a door sensor that senses opening or closing of a door, a radar sensor that is controlled by the vehicle intrusion management apparatus, is activated when the door is closed after being opened, and senses whether an occupant is present in an interior of the vehicle, and a camera configured to photograph the occupant in the interior of the vehicle.

According to another aspect of the present disclosure, a method of managing a vehicle intrusion includes steps of sensing presence of an occupant who intrudes into a vehicle, determining whether the occupant who intrudes into the vehicle is present based on a sensing result, and informing a user of the presence of the occupant who intrudes into the vehicle.

The informing of the presence of the occupant may include steps of transmitting a notification text informing of the presence of the occupant who intrudes into the vehicle to a user terminal when the presence of the occupant who intrudes into the vehicle is sensed before the user gets in the vehicle, and controlling an external lamp or a horn of the vehicle to inform the user.

The informing of the presence of the occupant may include a step of informing the user by using at least one of an in-vehicle mood lamp, a display, and seat vibration when the intrusion of the occupant occurs after the user gets in the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
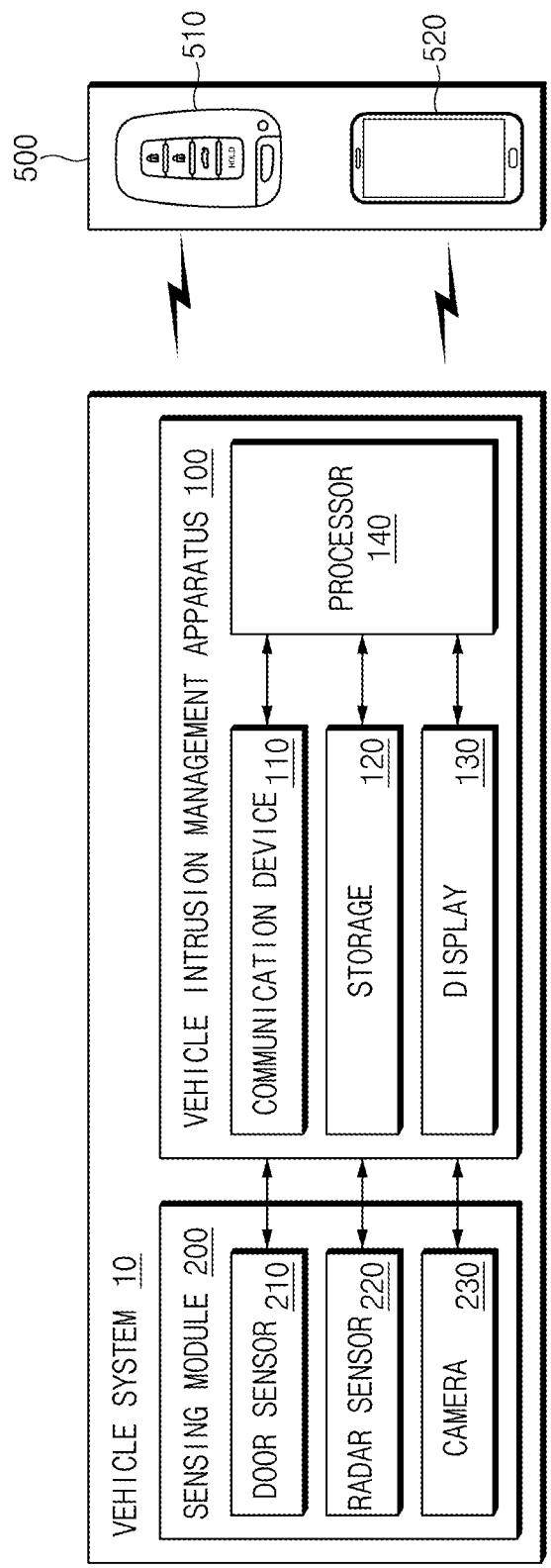
FIG. 1 is a block diagram illustrating the configuration of a vehicle system including a vehicle intrusion management apparatus according to a form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In describing the components of the present disclosure, terms like first, second, "A", "B", (a), and (b) may be used. These terms are intended solely to distinguish one component from another, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure discloses a configuration which is capable of detecting an occupant who intrudes into a rear seat of a vehicle before, after or while a user gets in the vehicle and immediately informing the user of the fact, thereby allowing the user to cope with the intrusion.

FIG. 1 is a block diagram illustrating the configuration of a vehicle system including a vehicle intrusion management apparatus according to a form of the present disclosure.

Referring to FIG. 1, a vehicle system 10 may include a vehicle intrusion management apparatus 100 and a sensing module 200. The vehicle system 10 may communicate with a user terminal 500 and the user terminal 500 may include a smart key 510 and a mobile terminal 520. The mobile terminal 520 may include all portable mobile communication terminals such as a smartphone, a pad, a PDA, and the like.

The vehicle intrusion management apparatus 100 may determine the presence of an occupant who intrudes into a vehicle, and may notify the user of the presence of the occupant who intrudes into the vehicle. In this case, when the vehicle intrusion management apparatus 100 detects that an occupant intrudes into the vehicle before the user boards the vehicle, even though the user does not recognize the fact and presses a unlock button through a smart key, the vehicle intrusion management apparatus 100 may control the vehicle to maintain a locked state.

The vehicle intrusion management apparatus 100 may include a communication device 110, storage 120, a display 130, and a processor 140.

The communication device 110 is a hardware device implemented with various electronic circuits for transmitting and receiving a signal through a wireless or wired connection. In the forms, the communication device 110 may perform communication in the vehicle through CAN communication, LIN communication, or the like, may communicate with the sensing module 200, and may wirelessly communicate with the user terminal 500 outside the vehicle through wireless communication. The communication device 110 may be controlled by the processor 140 and may transmit a notification text to the user terminal 500 when it is determined that an occupant who intrudes into the vehicle is present before the user gets in the vehicle. Although the communication device 110 included in the vehicle intrusion management apparatus 100 is illuminated in FIG. 1, the form is not limited thereof and the communication device 110 may be separately implemented as a telematics terminal or the like of a vehicle. The communication device 110 may be controlled by the vehicle intrusion management apparatus 100 and request a SOS to a police server or the like in a dangerous situation.

The storage 120 may store a sensing result of the sensing module 200 and intruding occupant information (presence, position information, and the like) obtained by the processor 140, and previously registered occupant information (occupant image information, occupant volume information, the number of occupants, and the like). The storage 120 may include a storage medium having at least one type of a flash memory type, a hard disk type, a micro type, a card type of a memory (for example, an SD, XD memory, or the like), RAM (Random Access Memory), SRAM (Static RAM), ROM (Read-Only Memory), EEPROM (Electrically Erasable Programmable Read-Only Memory), PROM (Programmable Read-Only Memory), MRAM (Magnetic RAM), a magnetic disc, and an optical disc.

The display 130 may be controlled by the processor 140 to display an informing screen when it is determined that an occupant who intrudes into the vehicle after the user gets in the vehicle. In this case, the informing screen may display the presence information of the intruding occupant, the location information of the intruding occupant, and the like. An example in which the informing screen is displayed on the display 130 will be described later with reference to FIGS. 6 and 7. In the present disclosure, although the display 130 is included in the vehicle intrusion management apparatus 100, the display 130 may be implemented as a head-up display (HUD) of the vehicle, a cluster, an audio video navigation (AVN) or the like. In addition, the display 130 may include at least one of a liquid crystal display (LCD), a thin film transistor liquid crystal display (TFT LCD), a light emitting diode (LED), an organic light emitting diode (OLED), an active matrix OLED (AMOLED), a flexible display, a bended display, and a three-dimensional (3D) display. Some of these displays may be implemented as transparent displays that are transparent or optically transparent to allow viewing of an outside. In addition, the display 130 may be provided as a touch screen including a touch panel, and may be used as an input device as well as an output device.

The processor 140 may be electrically connected to the communication device 110, the storage 120, the display 130, and the like, and may electrically control each component. The processor 140 may be an electric circuit that executes software commands and may perform various data processing and calculations described below.

When the presence of the occupant who intrudes into the vehicle is detected before the user gets in the vehicle, the processor 140 may notify the user by controlling an external lamp or horn of the vehicle. The processor 140 may control the external lamp to illuminate only in one direction. The control of the vehicle lamp will be described in detail later with reference to FIG. 5.

When the user is away from the vehicle by a preset distance or more, an ambient light is present, or the vehicle is located at an outdoor place, the processor 140 may turn on the exterior lamp at a bright intensity or control the flickering or turning on/off operation in a preset pattern. In addition, the processor 140 may control the external lamp of the vehicle to be turned on at a dark intensity or to be flickered or turned on or off in a preset pattern when the user is located within the preset distance from the vehicle, when the ambient light is dark, or when the vehicle is located at an indoor place. In this case, the exterior lamp of the vehicle may include at least one of a head lamp, a fog light, a tail light, a brake light, an emergency light, a room lamp, a daytime headlight, a welcome lamp, and a vehicle side light.

The processor 140 may inform the user by using at least one of an in-vehicle mood lamp, the display 130, and seat vibration when the intrusion of the occupant occurs after the user gets in the vehicle.

That is, the processor 140 may inform of whether the occupant who intrudes into the vehicle is present or the location of the occupant as a lighting position or lighting color of the in-vehicle mood lamp. The processor 140 may display whether the occupant who intrudes into the vehicle is present or the location of the occupant on the display to inform the user of the fact. The processor 140 may inform the user of whether the occupant who intrudes into the vehicle is present or the location of the intruding occupant as a vibration position or vibration intensity of a seat of the user.

The processor 140 may sense a change in the location of the occupant after a door is opened, determining whether the occupant who intrudes into the vehicle is present. The processor 140 may store occupant information and compare image information or volumetric information obtained by photographing the occupant who sits on a rear seat of the vehicle with information about the occupant registered in advance. When the image information or volumetric information does not correspond to the information about the occupant registered in advance, the processor 140 may determine the occupant as an intruder and inform the user of the fact. In this case, the processor 140 may obtain photographed image information of the occupant of the vehicle through a black box or the like.

When the number of occupants sitting on the rear seat of the vehicle is greater than or less than the number of persons stored in advance, the processor 140 may inform the user of the fact. Thus, the processor 140 may know whether an occupant such as a family, or the like properly gets in the vehicle, whether an occupant other than the family gets in the vehicle after the vehicle door is opened.

The sensing module 200 may sense the presence of an occupant who intrudes into the vehicle, sense the opening and closing of the door, and sense the presence of an occupant who is located close to the vehicle.

To this end, the sensing module 200 may include a door sensor 210, a radar sensor 220, and a camera 230, and if desired, may further include an ultrasonic sensor, a laser scanner and/or a corner radar, a Lidar, and the like.

The door sensor 210 senses the opening or closing of the vehicle door and provides it to the vehicle intrusion management apparatus 100.

The radar sensor 220 may be controlled by the vehicle intrusion management apparatus 100 and activated when the opening and closing of the door is sensed. The radar sensor 220 may detect the presence or absence of an occupant based on the movement and breathing of a human body in the vehicle, and detect the location of the occupant. The radar sensor 220 may be installed into a vehicle, and may be installed at the center of a vehicle rear seat, the end of a vehicle rear seat, or the like. In addition, the radar sensor 220 may sense whether an occupant is present, the location of an occupant, the volume of an occupant, or the like. The technique for detecting a change in the location and volume of an occupant by using the radar sensor 220 will be described in detail with reference to FIGS. 4A to 4D.

The camera 230 photographs the face of an occupant sitting at the rear seat of a vehicle and provides it to the vehicle intrusion management apparatus 100.

As described above, according to the present disclosure, it is possible to sense whether an intruder who intrudes into a vehicle before, after or while a user gets in the vehicle is present and inform the user of the fact, thereby assuring safety of the user and safety of the vehicle.

When an intruder gets in the vehicle before the user gets in the vehicle, the user may be informed of the fact. In this case, before the user gets in the vehicle, it is possible to perform the notification by utilizing an external lamp of the vehicle such as a smart key display, an emergency light, a horn, or the like before the user gets in the vehicle, and to perform the notification through a cluster display of the vehicle and an illumination color change after the user gets in the vehicle.

In addition, in an environment where it is difficult to identify the rear seat in the night or in a dark environment, in case where an unauthorized intrusion suddenly occurs after the user gets in the vehicle, when the intruder sneaks into the rear seat, the door opening is displayed through the cluster, and the user is informed of the fact that an occupant gets into the rear seat by changing the rear seat lighting color pattern.

In addition, according to the present disclosure, when it is desired to identify whether the boarding of an occupant on the rear seat is properly performed, by informing the user of whether the boarding is completed, it is possible to identify the boarding even if the user would like to identify whether the rear seat door is opened or an occupant such as a family or like properly boards the vehicle.

Figure 2:
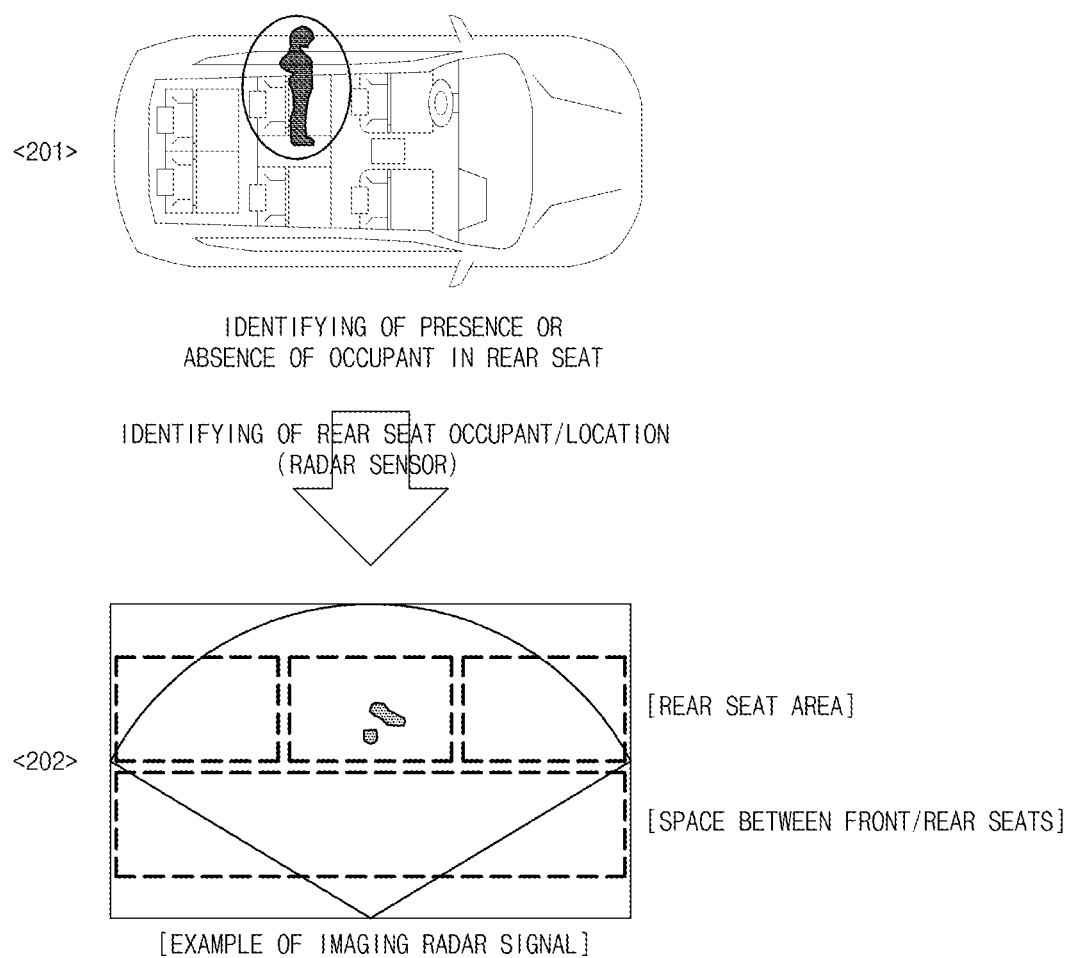
FIG. 2 is a diagram illustrating a method of sensing the presence or absence of an occupant in a rear seat according to a form of the present disclosure.

FIG. 2 is a diagram illustrating a method of sensing the presence or absence of an occupant in a rear seat according to a form of the present disclosure. As indicated by reference numeral 201 of FIG. 2, when an occupant is present in the rear seat inside the vehicle, it is possible to sense whether an occupant is present in the vehicle through the radar sensor 220 placed at an end of the vehicle rear seat or middle portion of the vehicle.

That is, the radar sensor 220 may be installed at the center of the rear seat in the interior of the vehicle to transmit a radar signal, and the vehicle intrusion management apparatus 100 may determine whether an occupant exists in the vehicle based on the intensity of a radar signal reflected by the occupant, the seat, or the like in the vehicle. That is, the vehicle intrusion management apparatus 100 may compare a combining value of the intensity of the radar signal reflected by at least one seat and the intensity of the signal reflected by the occupant sitting on at least one seat with a previously stored reference value to determine the presence or absence of an occupant. In addition, the intensity or distance information of a radar signal reflected and returned from a seat, a space right behind a drive seat and a passenger seat, and the like when the occupant is not present in the vehicle interior may be stored in advance, and the stored intensity or distance information may be compared with the intensity or distance information of a radar signal transmitted and reflected from the radar sensor 220 after the door opening is sensed, thereby sensing presence or absence of an occupant. Thus it is possible to sense an intruder even when the intruder hides under a seat without sitting in the seat.

Referring to reference numeral 202, an example of imaging a radar signal in a space between front and rear seats and in a rear seat area.

Figure 3A:
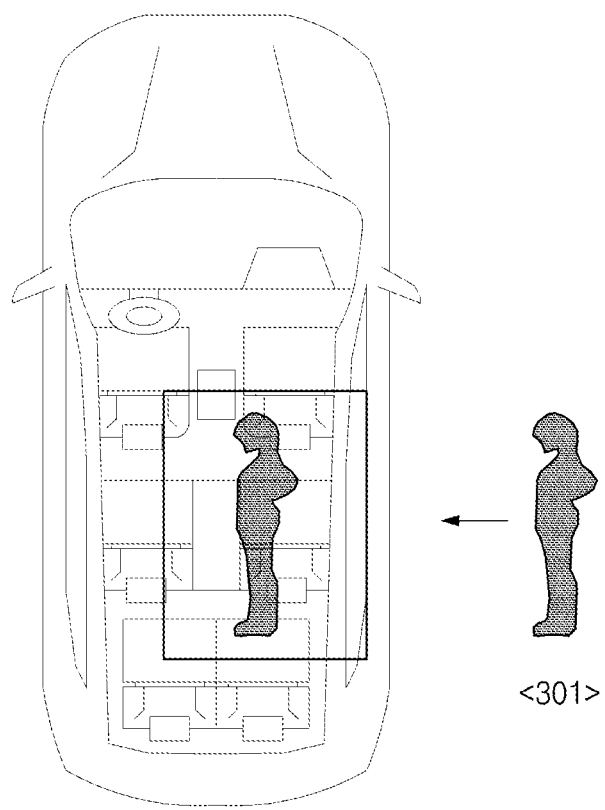
FIG. 3A is an exemplary diagram illustrating a screen of detecting and warning the location change of an occupant according to a form of the present disclosure.

FIG. 3A is an exemplary diagram illustrating a screen of detecting and warning the location change of an occupant according to a form of the present disclosure. Referring to FIG. 3A, the vehicle intrusion management apparatus 100 may recognize a case where an occupant approaches the vehicle, and when the occupant approaching the vehicle is aboard the vehicle, the vehicle intrusion management apparatus 100 may sense the change of an occupant 301 to determine whether the occupant 301 gets in the vehicle. In this case, the vehicle intrusion management apparatus 100 may know the location of the occupant approaching the vehicle through an ultrasonic sensor, a camera photographing an outside of the vehicle, and the like, and may know the location of the occupant in the interior of the vehicle through an in-vehicle radar sensor, a camera for photographing the interior of the vehicle, or the like when the occupant gets in the vehicle.

Figure 3B:
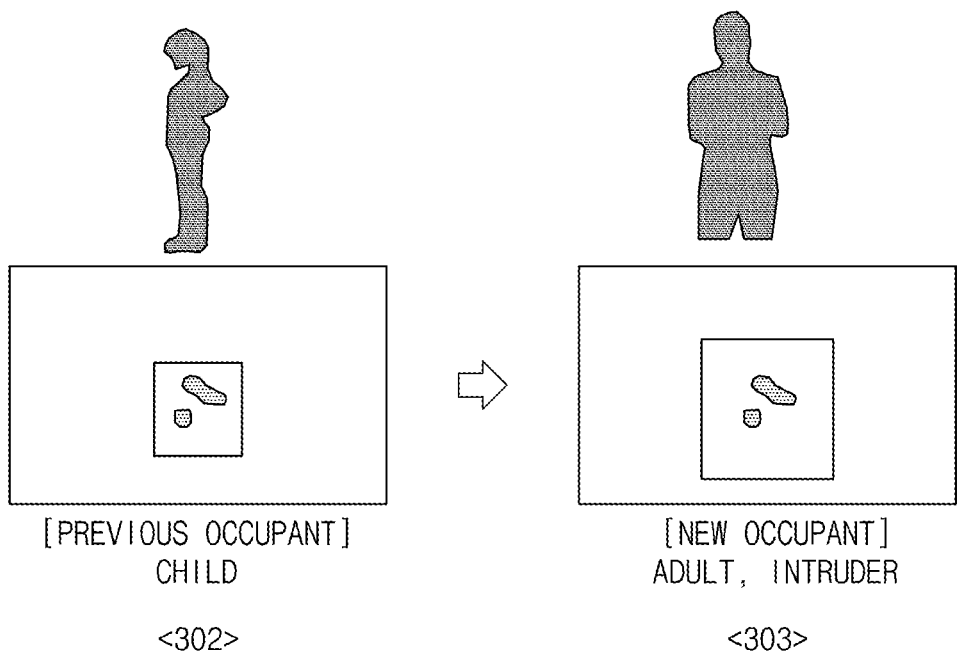
FIG. 3B is a diagram illustrating an exemplary operation for determining an occupant by comparing and analyzing an occupant and occupant information stored in advance according to a form of the present disclosure

FIG. 3B is a diagram illustrating an exemplary operation for determining an occupant by comparing and analyzing an occupant and occupant information stored in advance according to a form of the present disclosure.

Referring to FIG. 3B, children are usually boarded on the rear seat of a vehicle. The vehicle intrusion management apparatus 100 may store information about occupants mainly boarding on a vehicle in advance and determine whether the current occupant is the registered occupant in comparison with the information every time when an occupant is sensed. In this case, the vehicle intrusion management apparatus 100 may perform the occupant authentication based on the image information and the like, but may perform the occupant authentication based on the volume change of the occupant. That is, the vehicle intrusion management apparatus 100 may store the volumes (weights) of frequently boarding occupants 302 in advance and may compare it with the volume 303 of the currently boarding occupant to determine whether the occupant is unregistered or registered.

In addition, the vehicle intrusion management apparatus 100 may register the number of occupants who frequently get in the rear seats, and notify the user when all the occupants corresponding to the number of occupants do not get in the vehicle. For example, in case of a bus, a minibus, or the like, for a child care center, a nursery school, or the like, when the preset number of occupants do not board or get off, it is possible to inform the user of it, thereby allowing the number of occupants to be checked. In addition, when the number of occupants is greater than the number of occupants registered in advance, the vehicle intrusion management apparatus 100 may determine that unauthorized occupants exist in the vehicle and inform the user of the fact.

Hereinafter, a method of sensing the location and volume of an occupant in a vehicle will be described in detail with reference to FIGS. 4A to 4D.

Figure 4A:
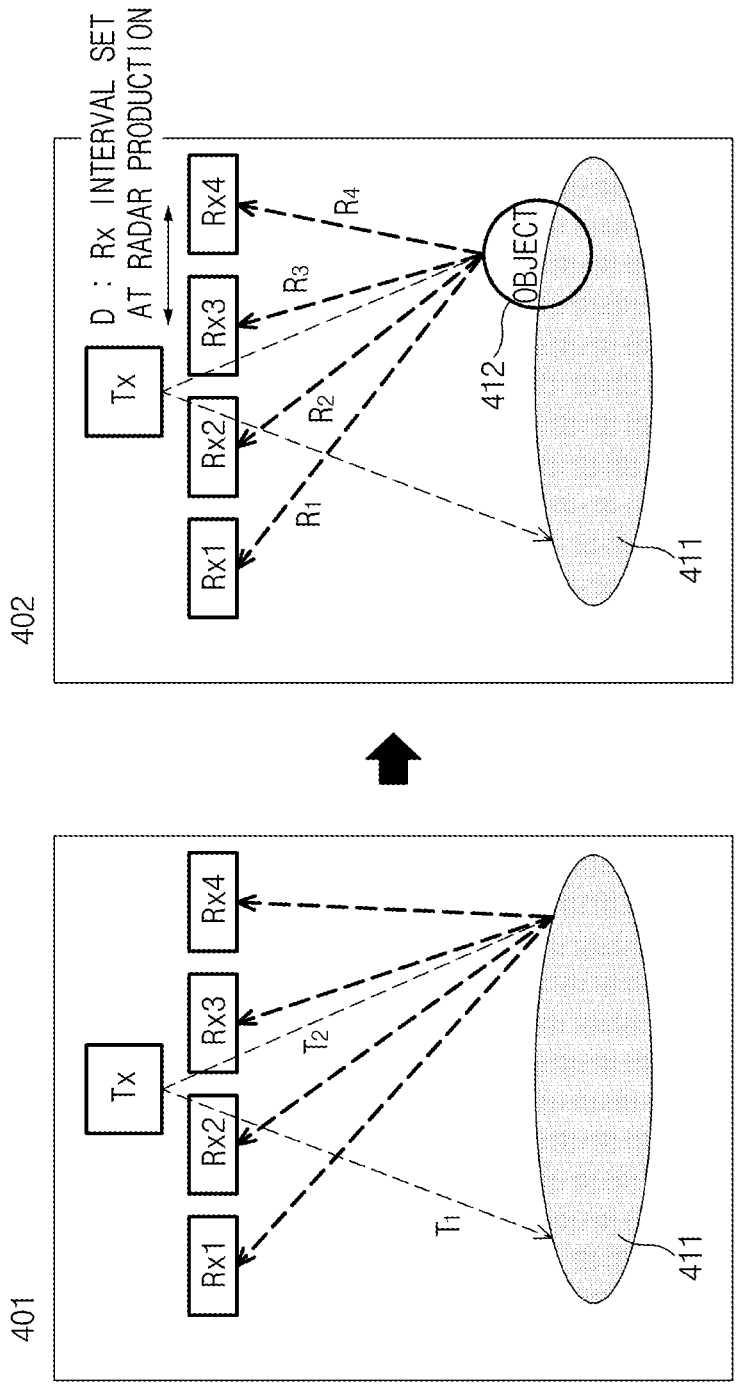
FIG. 4A is a diagram illustrating a method of sensing the location of an occupant according to a form of the present disclosure.

FIG. 4A is a diagram illustrating a method of sensing the location of an occupant according to a form of the present disclosure.

Referring to FIG. 4A, it is assumed that a radar signal is reflected in a sensing range 411 of a radar sensor after being transmitted from a transmitter Tx as shown by reference numeral 401 and then received by receivers Rx1 to Rx4, when the vehicle intrusion management apparatus 100 enters the sensing range 411 of the radar sensor in which an object 412 is set as shown by reference numeral 402, by using the difference between the distance values of the object 412 and the receivers Rx1 to Rx4 based on the signals received by the receivers Rx1 to Rx4, the coordinates of the object 412 may be calculated. In such a manner, the vehicle intrusion management apparatus 100 of the vehicle may calculate the coordinates of the object located in a specific space (radar sensor detection range).

Figure 4B:
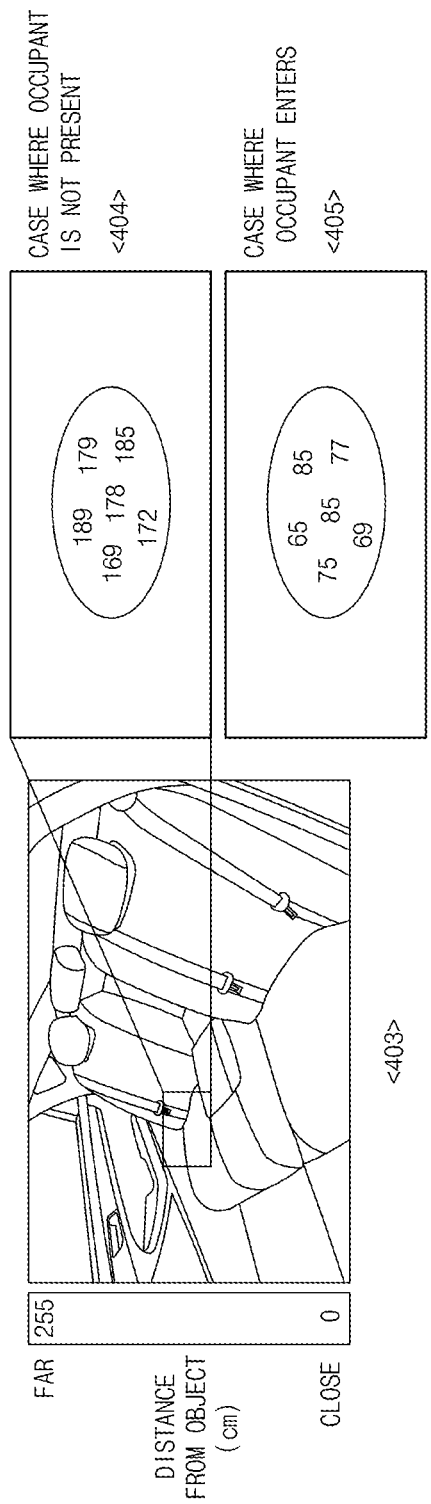
FIG. 4B is a diagram illustrating a method of sensing the location of an occupant in a rear seat of a vehicle according to a form of the present disclosure.
Figure 4C:
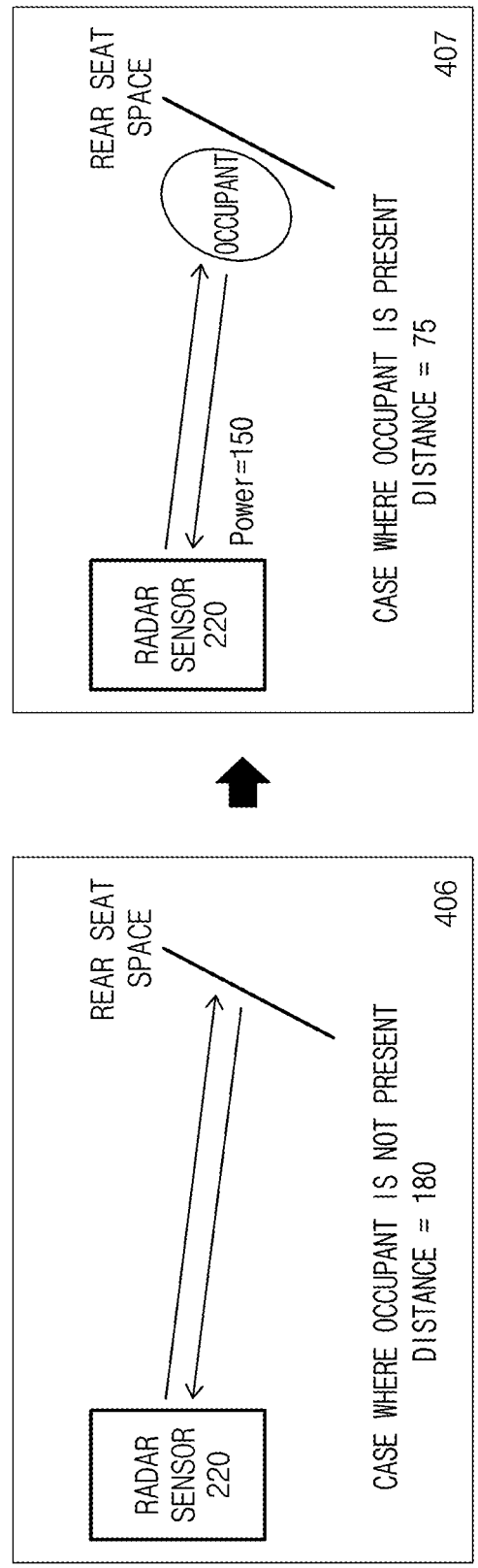
FIG. 4C is a diagram illustrating a method of sensing the location of an occupant through a radar sensor according to a form of the present disclosure.

FIG. 4B is a diagram illustrating a method of sensing the location of an occupant in a rear seat of a vehicle according to a form of the present disclosure. FIG. 4C is a diagram illustrating a method of sensing the location of an occupant through a radar sensor according to a form of the present disclosure.

As shown by reference numeral 403 of FIG. 4B, the radar sensor 220 may be installed in the vehicle, and may calculate the distance value based on the light transmitted and reflected to the rear seat space.

As shown by reference numeral 404 of FIG. 4B, when any occupants are not in the rear seat space, the distances to the specific area 430 of the rear seat space have values of 189, 179, 169, 178, 185, and 172. As shown by reference numeral 405, when an occupant enters the rear seat space, the distances from the radar sensor 220 to the rear seat space are reduced to 65, 75, 85, 77, and so on.

As shown by reference numeral 406 of FIG. 4C, when any occupants do not exist in the rear seat space, the distance from the radar sensor 220 to the rear seat space is 180. As shown by reference numeral 407, when an occupant exists, the distance from the radar sensor 220 to the rear seat space is 75, so that the distance from the radar sensor 220 to the rear seat space is shortened to 75 when an occupant exists.

Figure 4D:
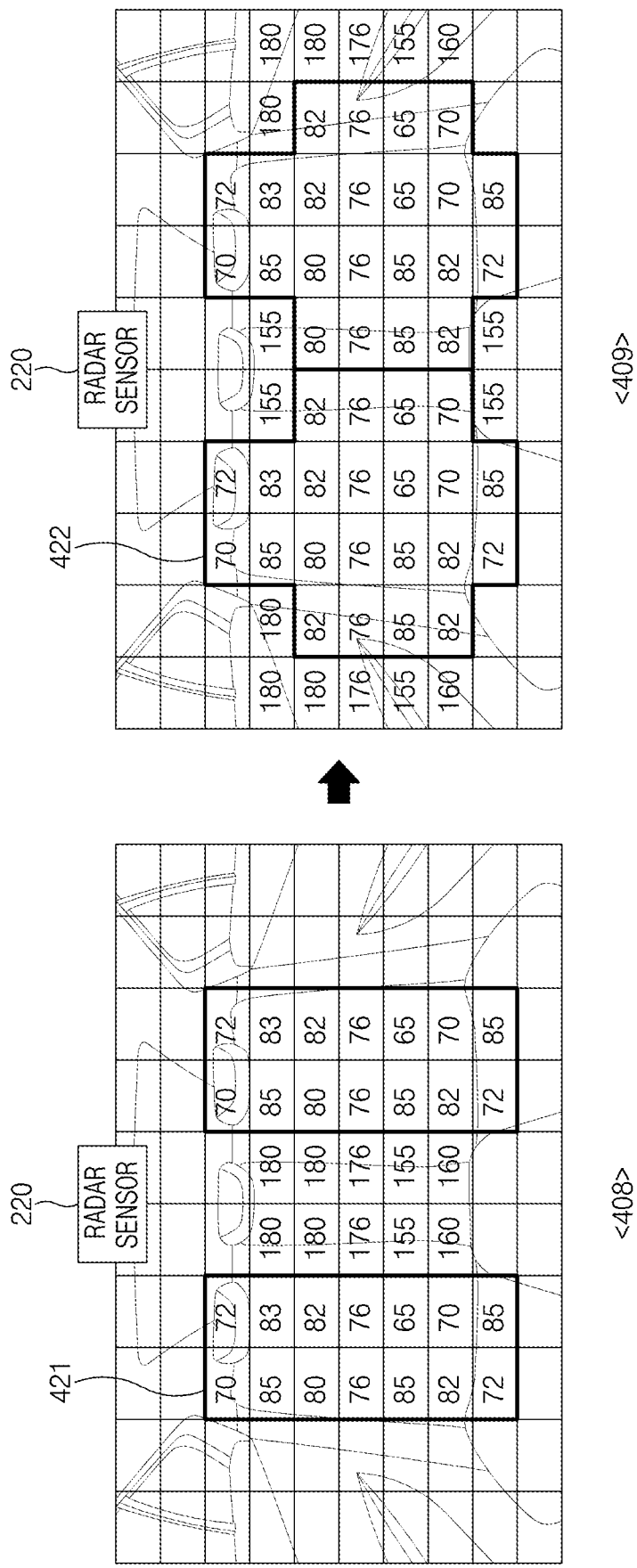
FIG. 4D is a diagram illustrating a method of classifying the volume of an occupant according to a form of the present disclosure.

FIG. 4D is a diagram illustrating a method of classifying the volume of an occupant according to a form of the present disclosure.

In FIG. 4D, reference numeral 408 of FIG. 4 denotes a distance value when a child is aboard, and reference numeral 409 of FIG. 4D denotes a distance value when an adult or a physically large person is aboard.

The vehicle intrusion management apparatus 100 may divide a field-of-view (FOV) space of a radar into various coordinates (each grid line) by using several radar transmitters Tx and a radar receiver Rx. The vehicle intrusion management apparatus 100 may utilize the numerical value of the radar reflected wave (distance) in the empty space which is shorter when an occupant is present. The area varying with the volume of an occupant may be large and the vehicle intrusion management apparatus 100 may know the volume of the occupant based on the area. That is, since the size of the area 421 in which the distance value of reference numeral 408 is changed is smaller than the area 422 in which the distance value of reference numeral 409 is changed, it may be determined that a child boards in the area 421 in which the distance value of reference numeral 408 is changed and an adult boards in the area 422 in which the distance value of reference numeral 409 is changed. In addition, the vehicle intrusion management apparatus 100 may grasp more finely than the exemplary image corresponding to the resolution of the radar sensor 220.

Hereinafter, an example of a method of notifying the user of the presence of an unauthorized occupant will be described in detail with reference to FIGS. 5 to 11.

Figure 5:
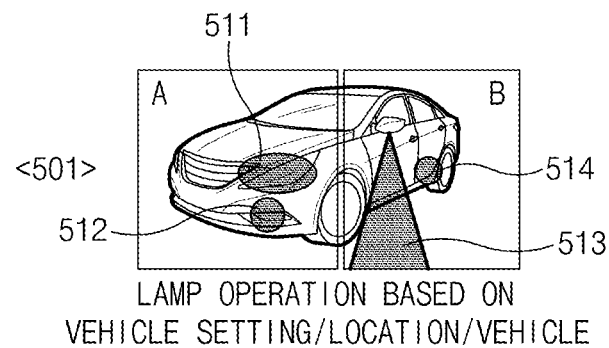
FIG. 5 is a diagram illuminating an example of performing an intruder notification through a vehicle lamp control according to a form of the present disclosure.
Figure 5:
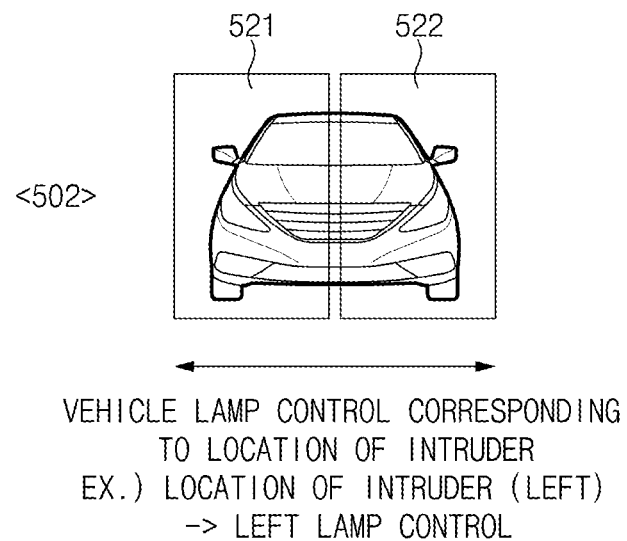

FIG. 5 is a diagram illuminating an example of performing an intruder notification through a vehicle lamp control according to a form of the present disclosure. The vehicle intrusion management apparatus 100 may control the operation of the vehicle lamp based on vehicle setting values, a location of an occupant who intrudes into the vehicle, a degree of risk, and the like.

Referring to reference numeral 501 of FIG. 5, the vehicle intrusion management apparatus 100 controls a lamp to be lightened brightly and strongly when a user tries to open the door from a distance (e.g., distance of 5 m or more), an ambient light exists, or it is in an outdoor condition. For example, when the user tries to open the door at a distance of 5 m or more, the vehicle intrusion management apparatus 100 may allow a head lamp 511, a daytime running light (DRL), a fog light 512, a rear lamp, a brake light, and the like to be turned on or flickered to perform a pattern recognizable by the user, such that the user may recognize the fact before getting in the vehicle. For example, the pattern recognizable by a user may include a flicker of a headlamp, lightening only for one second once, and the like.

The vehicle intrusion management apparatus 100 performs notification to the user in dark illumination under conditions in which the user approaches the vehicle (e.g., within a distance of 5 m), the vehicle is in a dark place without ambient light, or an indoor parking lot. For example, the vehicle intrusion management apparatus 100 may operate a welcome lamp 514, a vehicle side lamp 513, and the like to perform a notification to the user.

Referring to reference numeral 502 of FIG. 5, it is possible to control the vehicle lamp corresponding to the location of an intruder. For example, when the occupant intruding into the vehicle is located at the right side 521 of the vehicle, the vehicle intrusion management apparatus 100 may turn on or flicker the lamp on the right side of the vehicle, and when the occupant is located at the left side 522 of the vehicle, the vehicle intrusion management apparatus 100 may turn on or flicker the lamp on the left side of the vehicle, such that the user may estimate the location of the occupant in the vehicle.

Figure 6:
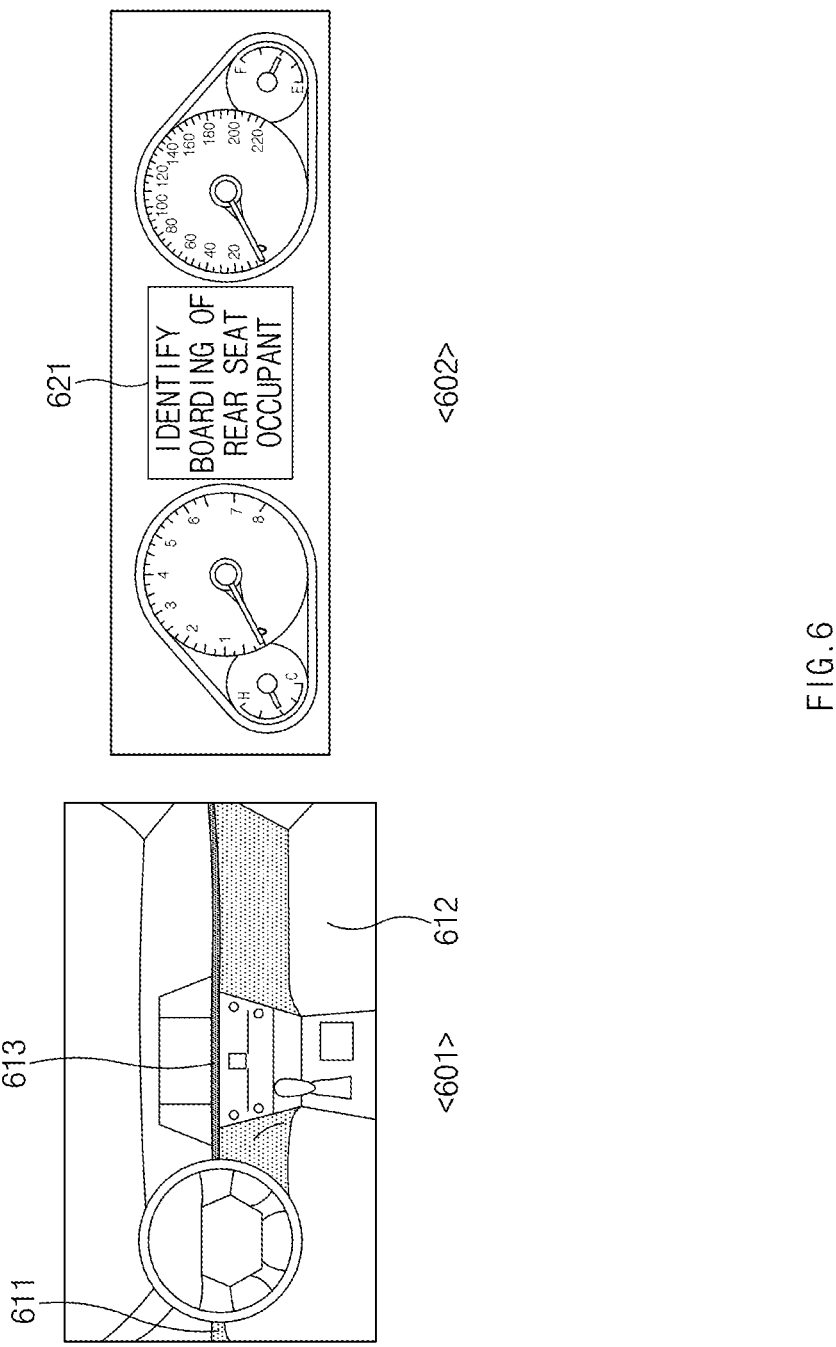
FIG. 6 is a diagram illustrating an example of performing an intruder notification through an in-vehicle mood lamp and a display according to a form of the present disclosure.

FIG. 6 is a diagram illustrating an example of performing an intruder notification through an in-vehicle mood lamp and a display according to a form of the present disclosure.

In a dangerous situation such as the presence of an unauthorized intruder, a weak notification which is identified only by the user is desired rather than a strong notification. Referring to reference numeral 601 of FIG. 6, the vehicle intrusion management apparatus 100 may perform a notification through a small brightness change of in-vehicle mood lamps 611, 612, and 613, a color change, a cluster lamp, and the like, thereby allowing the user to be noticed.

In addition, referring to reference numeral 602 of FIG. 6, the vehicle intrusion management apparatus 100 may output a text "Identify occupant sitting on rear seat" to a display window 621 of a cluster, thereby allowing the user to identify it.

Figure 7:
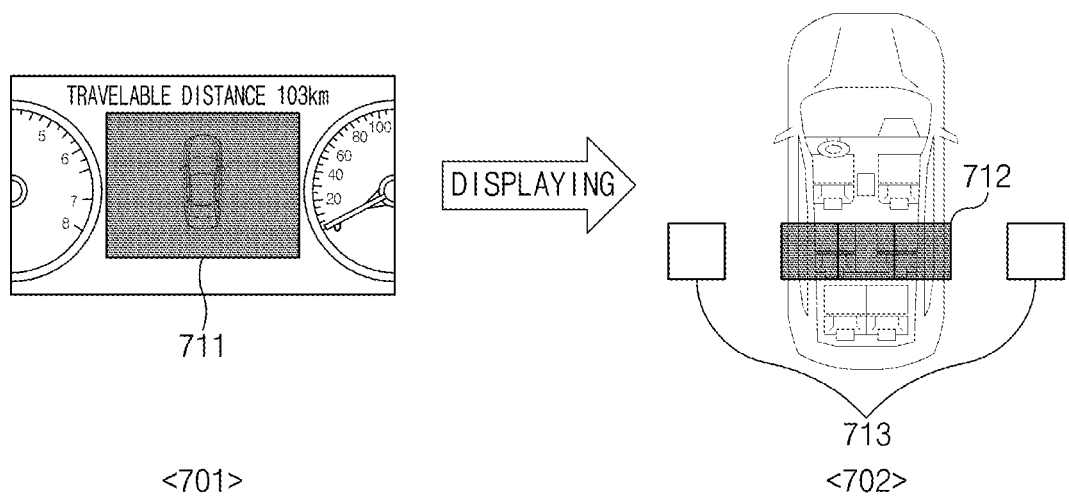
FIG. 7 is a diagram illustrating an example of displaying a location of an occupant in a vehicle rear seat according to a form of the present disclosure.

FIG. 7 is a diagram illustrating an example of displaying a location of an occupant in a vehicle rear seat according to a form of the present disclosure.

Referring to reference numeral 701 of FIG. 7, it may be understood that the vehicle intrusion management apparatus 100 displays a vehicle rear seat state on a display window 711 in a cluster. In this case, as indicated by reference numeral 702, the vehicle door open indication 713 and the rear seat occupant presence and absence/boarding indication 712 may be performed.

Figure 8:
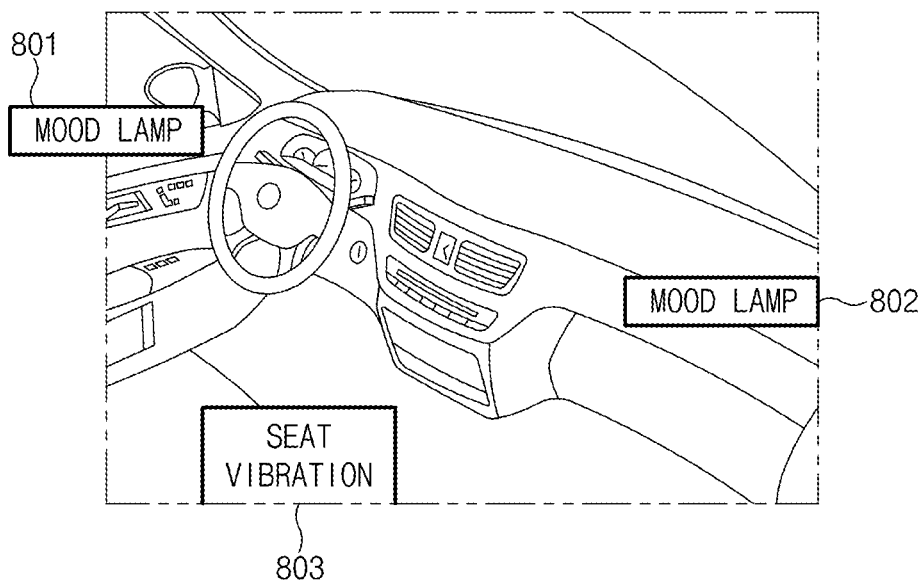
FIG. 8 is a diagram illustrating an example of performing an intruder notification through an in-vehicle mood lamp and a seat vibration according to a form of the present disclosure.

FIG. 8 is a diagram illustrating an example of performing an intruder notification through an in-vehicle mood lamp and a seat vibration according to a form of the present disclosure.

Referring to FIG. 8, the vehicle intrusion management apparatus 100 may inform a user through lighting of in-vehicle mood lamps 801 and 802 in the vehicle, change of color, and the like, or may perform a notification through a seat vibration 803 or a speaker embedded in a seat. In this case, the vehicle intrusion management apparatus 100 may output a preset intensity of vibration, a vibration pattern, a vibration direction, and the like to the user, thereby allowing the user to recognize whether an intrusion occurs. For example, when the vibration direction is left vibration, it may be recognized that the occupant intrudes from the left side of the rear seats. When the vibration direction is right vibration, it may be recognized that the occupant intrudes from the right side of the rear seats. When the vibration is generated at the center of the vehicle rear seat or on the whole, it may be recognized that the occupant is in the center. That is, when a mood lamp having reference numeral 801 is turned on, it may mean that the occupant is located at the left side of the rear seats, and when a mood lamp having reference numeral 802 is turned on, it may mean that the occupant is located at the right side of the rear seats.

Figure 9:
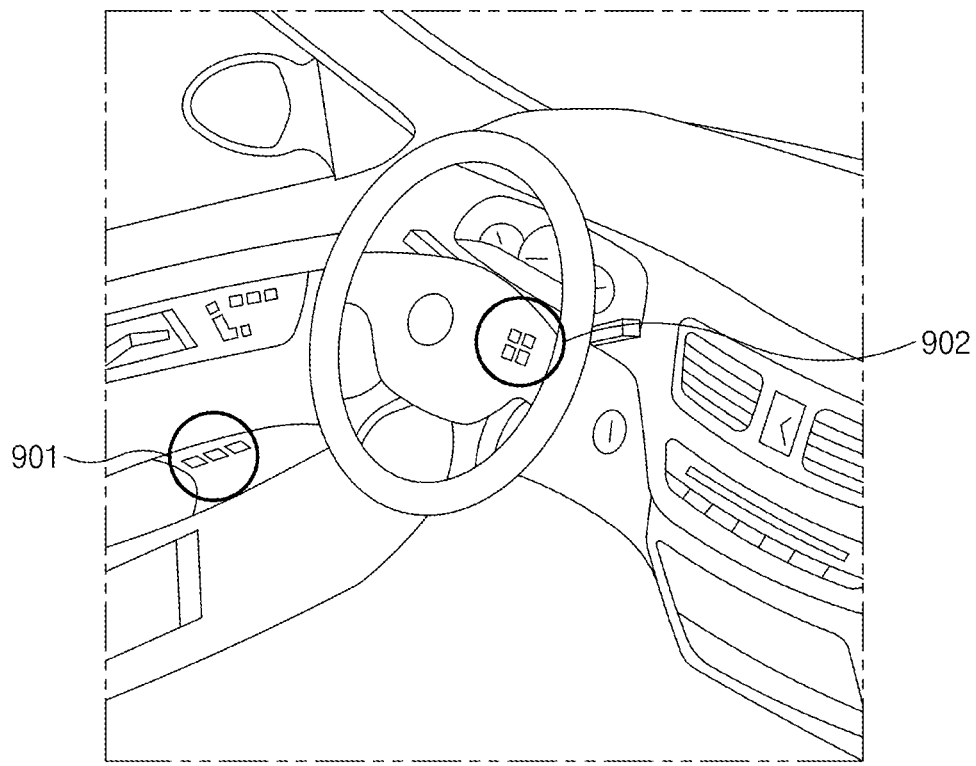
FIG. 9 is a diagram illustrating an example of performing an unauthorized occupant detection mode stop according to a form of the present disclosure.

FIG. 9 is a diagram illustrating an example of performing an unauthorized occupant detection mode stop according to a form of the present disclosure.

Referring to FIG. 9, when any occupants are not detected in the vehicle, or the occupant detected in the vehicle is registered, that is, when the occupant detection and notification are no longer required, the vehicle intrusion management apparatus 100 may allow the occupant detection mode to be inactivated through the a driver seat door button 901 or a steering wheel button 902. Thus, the vehicle intrusion management apparatus 100 inhibits undesired occupant detection.

Figure 10:
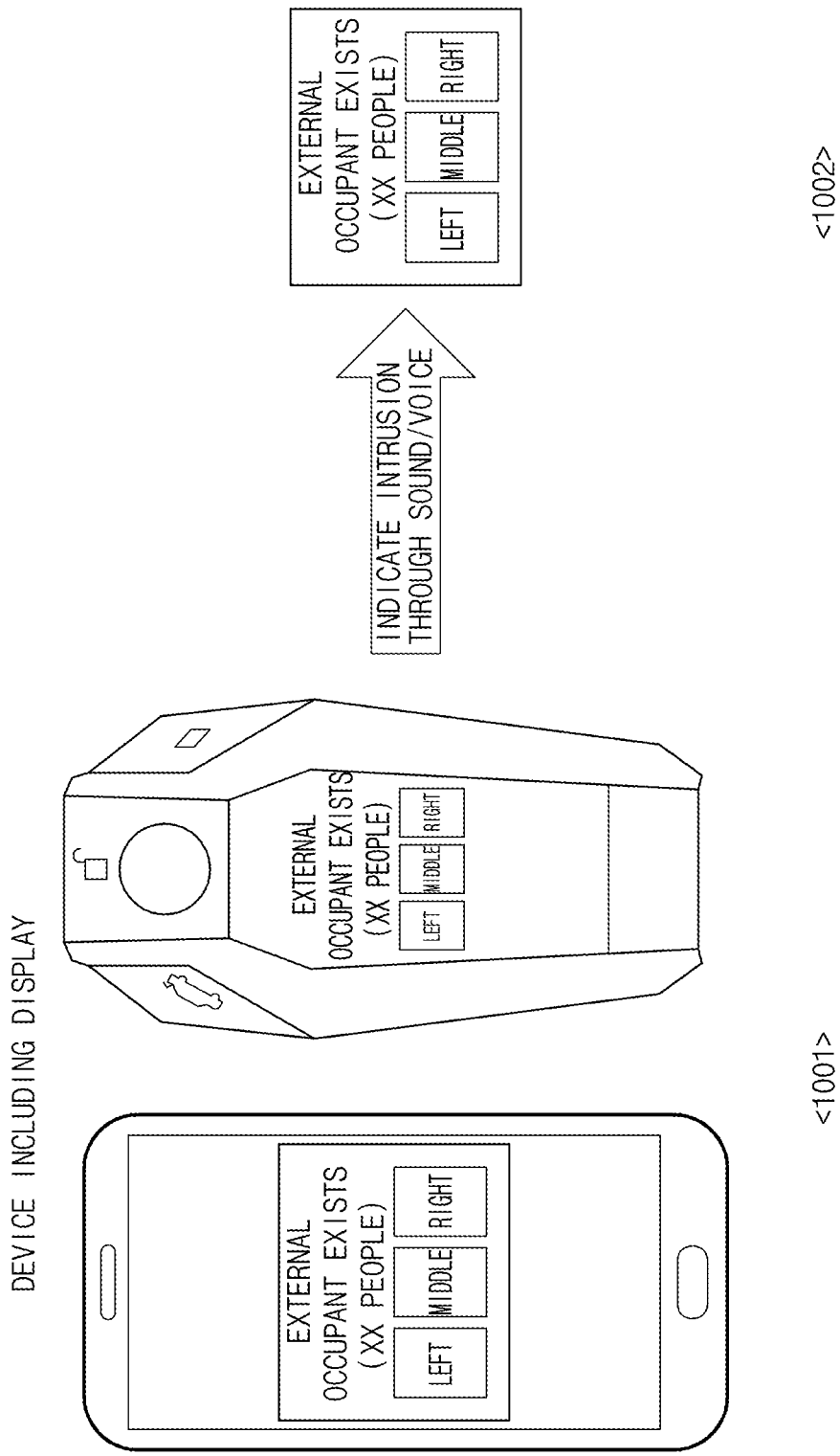
FIG. 10 is a diagram illustrating an example of displaying an occupant notification on a user terminal including a display according to a form of the present disclosure.

FIG. 10 is a diagram illustrating an example of displaying an occupant notification on a user terminal including a display according to a form of the present disclosure.

Referring to FIG. 10, when an occupant existence notification (whether a simple occupant or intruder is present) is performed through a user terminal 500 including a display as indicated by reference numeral 1001, the vehicle intrusion management apparatus 100 may display the presence or absence of an external occupant, the number of occupants, and the location (left, middle, right) in the vehicle on the screen of the user terminal 500. In this case, the user terminal 500 may output whether intrusion occurs by sound or voice by reference numeral 1002. In this case, the user terminal including the display may include a smart phone and a smart key, and a user terminal that does not include a display may include a fob key or the like.

Figure 11:
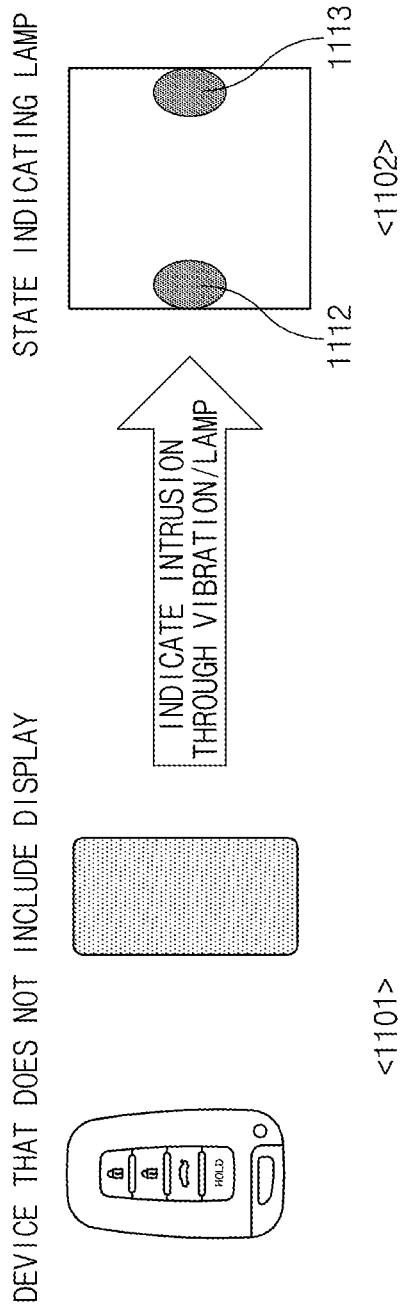
FIG. 11 is a diagram illustrating an example of displaying an occupant notification through a state indication lamp in a user terminal that does not include a display according to a form of the present disclosure.

FIG. 11 is a diagram illustrating an example of displaying an occupant notification through a state indication lamp in a user terminal that does not include a display according to a form of the present disclosure.

Referring to FIG. 11, when an occupant existence notification is performed through the user terminal 500 that does not include a display as indicated by reference numeral 1101, the vehicle intrusion management apparatus 100 may display the presence or absence of an occupant through vibration or a lamp. As indicated by reference numeral 1102, the presence or absence of an occupant may be known by using whether state indication lamps 1112 and 1113 are turned on or off. In addition, it is possible to know the location of the intruding occupant based on the lighting location of the state indication lamp. For example, when the state indication lamp 1112 on the left is turned on, the vehicle intrusion management apparatus 100 may determine that the occupant is located at the left side of the vehicle, when the state indication lamp 1113 on the right is turned on, the vehicle intrusion management apparatus 100 may determine that the occupant is located at the right side of the vehicle, and when all the state indication lamps 1112 and 1113 on the left and right are turned on, the vehicle intrusion management apparatus 100 may determine that the occupant is located in the middle. In addition, it is possible to recognize the intrusion and the location by changing the flicker pattern of the left and right state indication lamps 1112 and 1113. For example, when the state indication lamps 1112 and 1113 are flickered every interval of two seconds, the vehicle intrusion management apparatus 100 may determine that the occupant is located at the left. When the state indication lamps 1112 and 1113 are flickered every interval of one second, the vehicle intrusion management apparatus 100 may determine that the occupant is located at the right. When the state indication lamps 1112 and 1113 are rapidly flickered every interval of 0.5 seconds, the vehicle intrusion management apparatus 100 may determine that the occupant is located in the middle.

Figure 12:
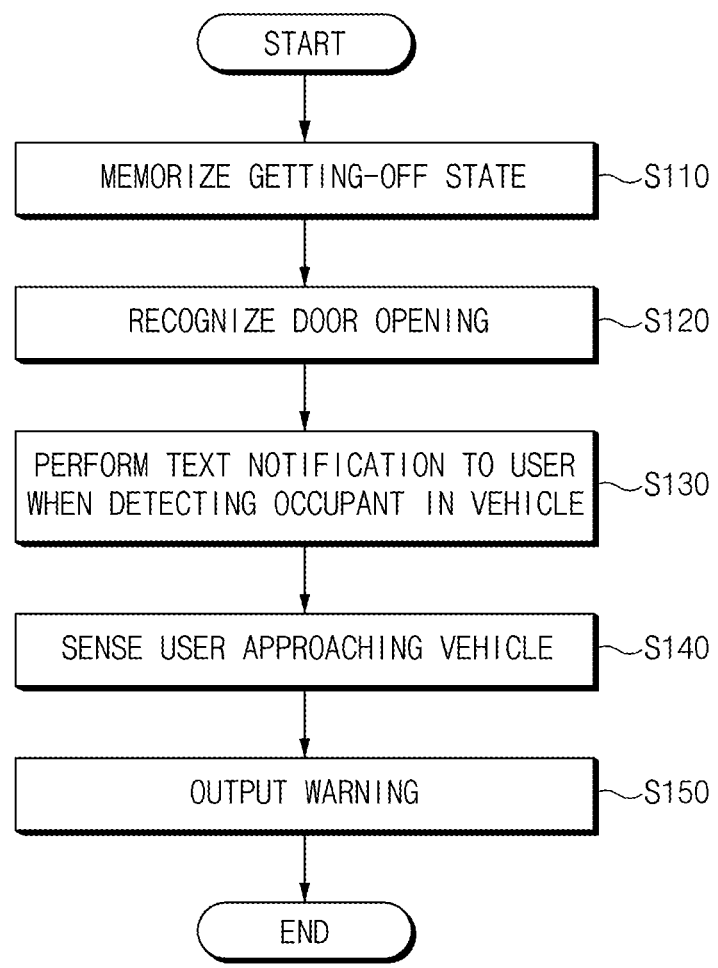
FIG. 12 is a flowchart illustrating a vehicle intrusion management method for detecting an occupant before a user gets in a vehicle according to a form of the present disclosure.

Hereinafter, a vehicle intrusion management method for detecting an occupant before the user gets in the vehicle according to a form of the present disclosure will be described in detail with reference to FIG. 12. FIG. 12 is a flowchart illustrating a vehicle intrusion management method for detecting an occupant before a user gets in a vehicle according to a form of the present disclosure. In the following description, it is assumed that the vehicle intrusion management apparatus 100 of FIG. 1 performs the process of FIG. 12. In addition, in the description of FIG. 12, it may be understood that the operation described as being performed by the apparatus is controlled by the processor 140 of the apparatus 100.

Referring to FIG. 12, in operation S110, the vehicle intrusion management apparatus 100 stores and memorizes a getting off state. Thereafter, the vehicle is parked and is turned off.

In a state in which the vehicle is in the turned-off state, when the opening of the door is recognized in operation S120, the vehicle intrusion management apparatus 100 may detect the presence of an occupant in the vehicle interior and may perform a text notification to the user in operation S130. In this case, the vehicle intrusion management apparatus 100 may detect whether the door is opened through the door sensor 210, and detect whether the occupant is present in the vehicle through the radar sensor 220 or the camera 230. In addition, the vehicle intrusion management apparatus 100 may continuously monitor the occupant who does not move while hiding in the vehicle rear seat through the radar sensor 220, and may obtain biometric information of the occupant such as respiration, heartbeat, and the like rather than a simple movement, thereby continuously monitoring the occupant state.

Thereafter, when a user having the user terminal 500 such as the smart key 510, the mobile terminal 520, or the like capable of communicating with the vehicle system 10, approaches the vehicle, the vehicle intrusion management apparatus 100 may detects the approach of the user in operation S140, and in operation S150, may output a warning to the user that the occupant is present in the vehicle interior. In this case, the vehicle intrusion management apparatus 100 may perform an alarm by performing output of a horn, a head lamp, a speaker, and the like of the vehicle. As described above, when the presence of the occupant intruding into the vehicle is detected, the vehicle intrusion management apparatus 100 may maintain the door lock state to protect the user even when the user approaches the vehicle and presses an unlock button. In addition, when the user presses the unlock button, the vehicle intrusion management apparatus 100 notifies the presence of the occupant who intrudes into the room through vibration, the state indication lamp, the mobile terminal, or the like again. Thereafter, after the user identifies the intruder or the problem situation is terminated, the vehicle intrusion management apparatus 100 releases the unlock mode lock by pressing the unlock button for a long time or a smartphone intrusion detection confirmation button.

As described above, according to the present disclosure, it is possible to identify an intrusion of an occupant who intrudes into the vehicle, inhibiting an accident that may occur due to it, and identify an occupant in the vehicle in a dark parking lot or in a dark night time in which it is difficult to identify the occupant, thereby giving the user peace of mind. Specifically, for female drivers or elder people who may surprise even a sign of a person being around, it is possible to identify the vehicle state in advance, thereby giving peace of mind.

Figure 13:
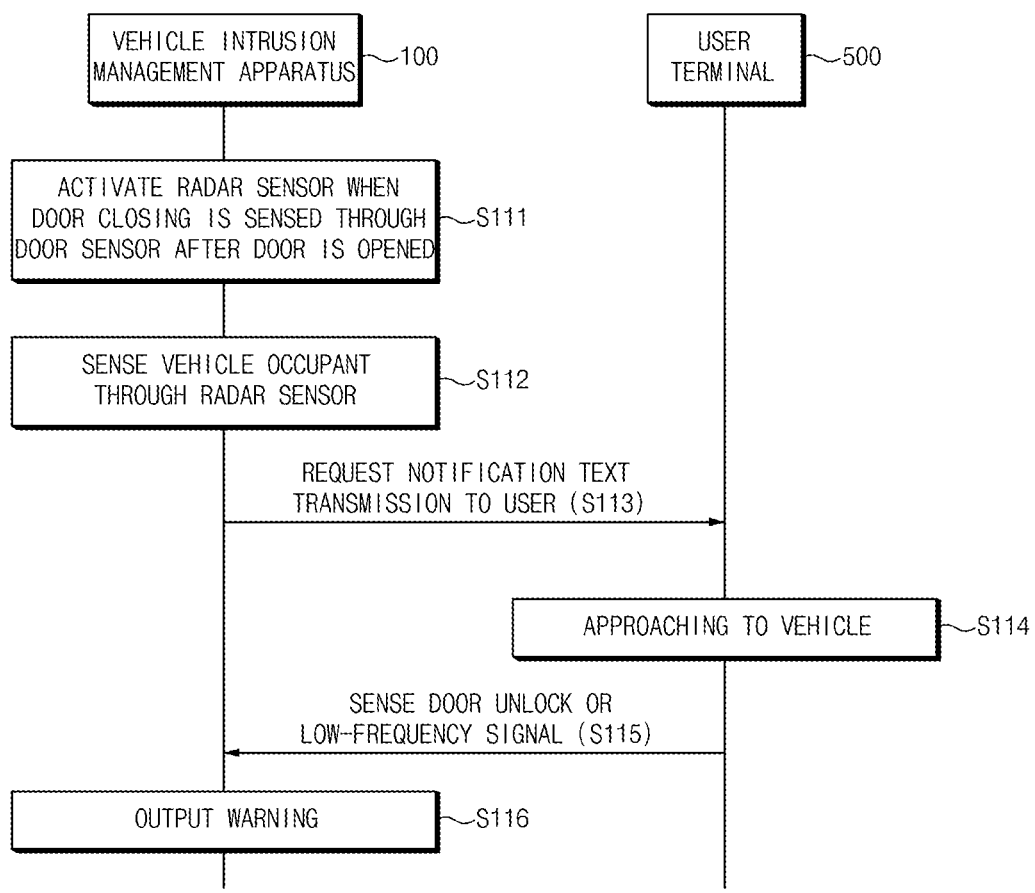
FIG. 13 is a flowchart illustrating a method of detecting an occupant before a user gets into a vehicle according to a form of the present disclosure.

Hereinafter, a method of detecting an occupant before a user gets into a vehicle illustrated in FIG. 12 will be described in more detail with reference to FIG. 13. FIG. 13 is a flowchart illustrating a method of detecting an occupant before a user gets into a vehicle according to a form of the present disclosure. In the following description, it is assumed that the vehicle intrusion management apparatus 100 of FIG. 1 performs the process of FIG. 13. In addition, in the description of FIG. 13, it may be understood that the operations described as being performed by the apparatus are controlled by the processor 140 of the apparatus 100.

Referring to FIG. 13, in operation S111, the vehicle intrusion management apparatus 100 activates the radar sensor 220 when door opening and closing are detected by the door sensor 210.

Thereafter, in operation S112, the vehicle intrusion management apparatus 100 may detect the presence or absence of an occupant in the interior of the vehicle by the radar sensor 220. In operation S113, when there is an occupant in the interior of the vehicle, the vehicle intrusion management apparatus 100 transmits a notification text to the user terminal 500. Accordingly, the user may recognize in advance that there is an unauthorized occupant in the interior of the vehicle through the notification text received by the user terminal 500.

In addition, when the user having the user terminal 500 approaches the vehicle in operation S114, the user terminal 500 and the vehicle intrusion management apparatus 100 transmit and receive user authentication, a start-on signal, a door unlocking signal in operation S115. In operation S116, the vehicle intrusion management apparatus 100 recognizes the approach of the user and outputs a warning. Thus, the user may intuitively recognize the presence of an intruder through a warning lamp or a warning sound.

As described above, according to the present disclosure, it is possible to allow the user to identify in advance whether an intruder is present in a vehicle, so that a dangerous situation such as a vehicle theft or a human accident may be inhibited in advance.

Figure 14:
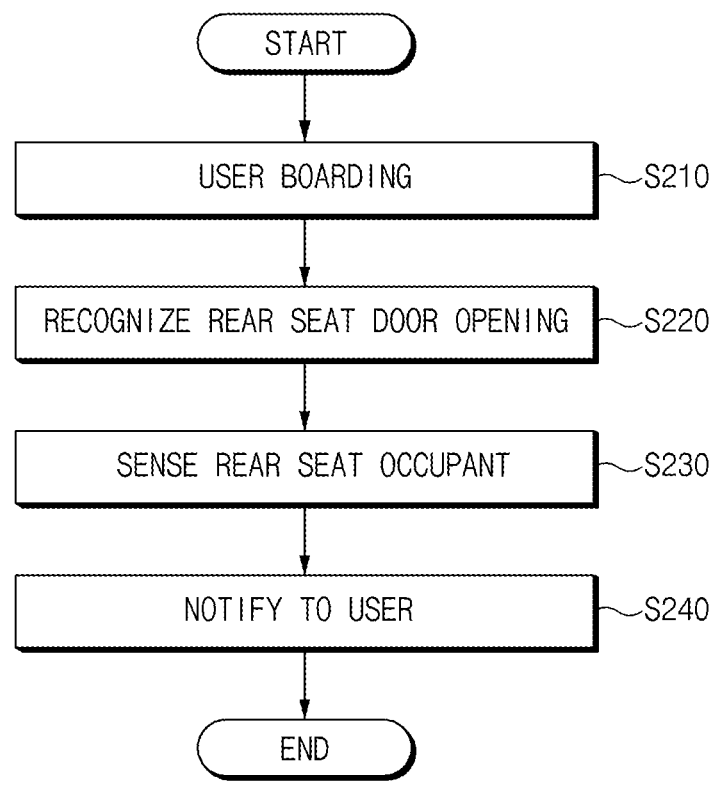
FIG. 14 is a flowchart illustrating a method of managing a vehicle intrusion while or after a user gets into a vehicle according to another form of the present disclosure.

Hereinafter, a method of managing a vehicle intrusion while or after a user gets into a vehicle according to another form of the present disclosure will be described in detail with reference to FIG. 14. FIG. 14 is a flowchart illustrating a method of managing a vehicle intrusion while or after a user gets into a vehicle according to another form of the present disclosure. Hereinafter, it is assumed that the vehicle intrusion management apparatus 100 of FIG. 1 performs the process of FIG. 14. In addition, in the description of FIG. 14, it may be understood that the operations described as being performed by the apparatus are controlled by the processor 140 of the apparatus 100. That is, FIG. 14 illustrates an example of a case where a user gets into a vehicle before another occupant intrudes into the vehicle.

Referring to FIG. 14, when the user recognizes door opening through the door sensor 210 in operation S220 after the user gets into the vehicle in operation S210, in operation S230, the vehicle intrusion management apparatus 100 detects whether an occupant is present in the rear seats through the radar sensor 220 or the camera 230. When there is an occupant in the rear seat, the vehicle intrusion management apparatus 100 informs the user of information about the rear seat occupant in operation S240. The vehicle intrusion management apparatus 100 may perform a notification of the presence of the occupant in the rear seat through a cluster, a speaker, and the like of the vehicle.

In this case, the vehicle intrusion management apparatus 100 may determine whether the occupant in rear seat is a registered occupant based on the previously stored occupant information, and may inform the user of it. That is, when the occupant in the rear seat is not registered, the user may be informed that there is an unauthorized occupant in the vehicle, and when the occupant is a registered passenger, the vehicle intrusion management apparatus 100 may not perform a separate notification to the user.

The vehicle intrusion management apparatus 100 may notify the user of the presence of an occupant who intrudes into the rear seat while the user gets in the vehicle, and at the same time, request an SOS to the police to quickly cope with it.

Figure 15:
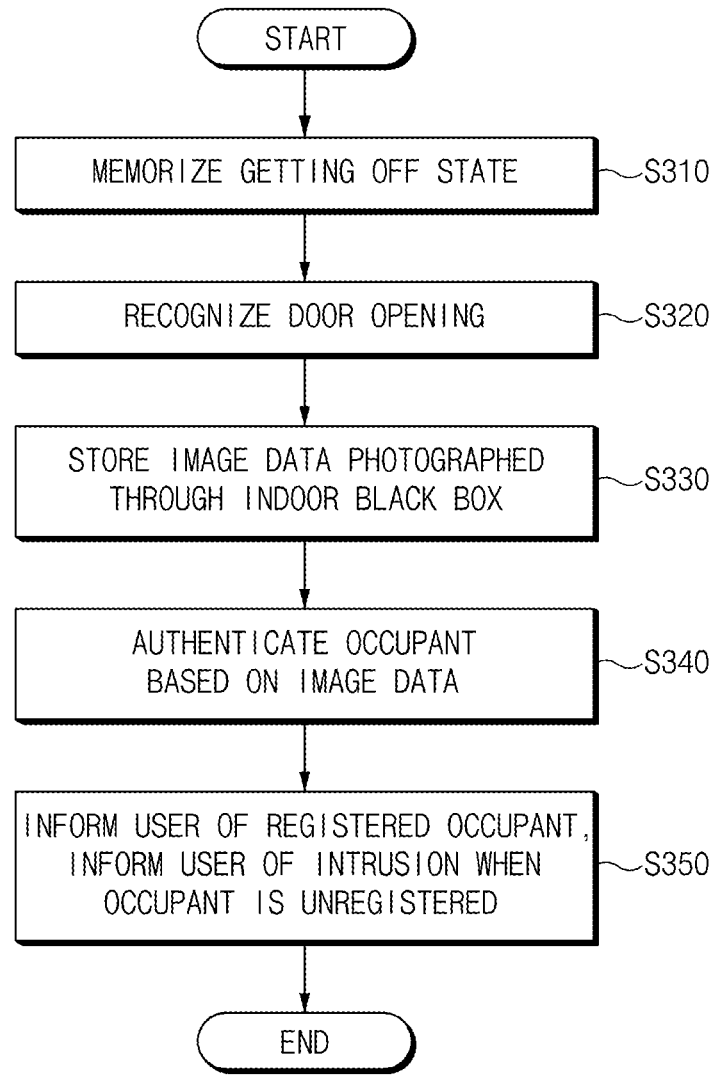
FIG. 15 is a flowchart illustrating a vehicle intrusion management method for identifying and providing occupant information according to still another form of the present disclosure.

Hereinafter, a vehicle intrusion management method for identifying occupant information and providing the information to a user according to another form of the present disclosure will be described in detail with reference to FIG. 15. FIG. 15 is a flowchart illustrating a vehicle intrusion management method for identifying and providing occupant information according to another form of the present disclosure.

Hereinafter, it is assumed that the vehicle intrusion management apparatus 100 of FIG. 1 performs the process of FIG. 15. In addition, in the following description of FIG. 15, it may be understood that the operations described as being performed by the apparatus are controlled by the processor 140 of the apparatus 100. That is, FIG. 15 illustrates an example of a case of determining whether an unauthorized occupant intrudes into a vehicle based on a black box and performing a notification.

Referring to FIG. 15, in operation S310, the vehicle intrusion management apparatus 100 stores and memorizes a getting off state at the turned-off after a vehicle is parked.

In a state where the vehicle is in the turned-off state or the user gets into the vehicle to start to drive the vehicle, when the vehicle intrusion management apparatus 100 detects the door opening of the vehicle in operation S320, the vehicle occupant is photographed based on the black box in operation S330.

In operation S340, the vehicle intrusion management apparatus 100 may photograph the face of the occupant through a camera of the black box and compare the photographed image data based on the black box with the information about the occupant stored in advance to perform the occupant authentication. That is, the face information, the body information, and the like of a frequently boarding occupant may be registered in advance, and compared with the photographed image data to perform the occupant authentication. In this case, the vehicle intrusion management apparatus 100 may perform the occupant authentication according to whether the occupant is registered by comparing the feature information of the occupant registered in advance and the feature information extracted from the photographed image data.

In operation S350, when the occupant is a registered occupant, the vehicle intrusion management apparatus 100 informs the user that the occupant is a registered occupant, and when the occupant is an unregistered occupant, the vehicle intrusion management apparatus 100 informs the user that the occupant is an unauthorized intruder.

In addition, the vehicle intrusion management apparatus 100 may ask an SOS for a police station immediately upon recognizing the occupant who intrudes into the vehicle, thereby assuring the safety of the user.

In addition, the vehicle intrusion management apparatus 100 performs authentication of an occupant so that the vehicle intrusion management apparatus 100 is capable of being utilized as a system for identifying whether an occupant gets into a vehicle or there is an unauthorized occupant in case where it is difficult to identify all situations in which passengers often get in and out, such as a minibus or a group bus used in a kindergarten or a daycare center.

Figure 16:
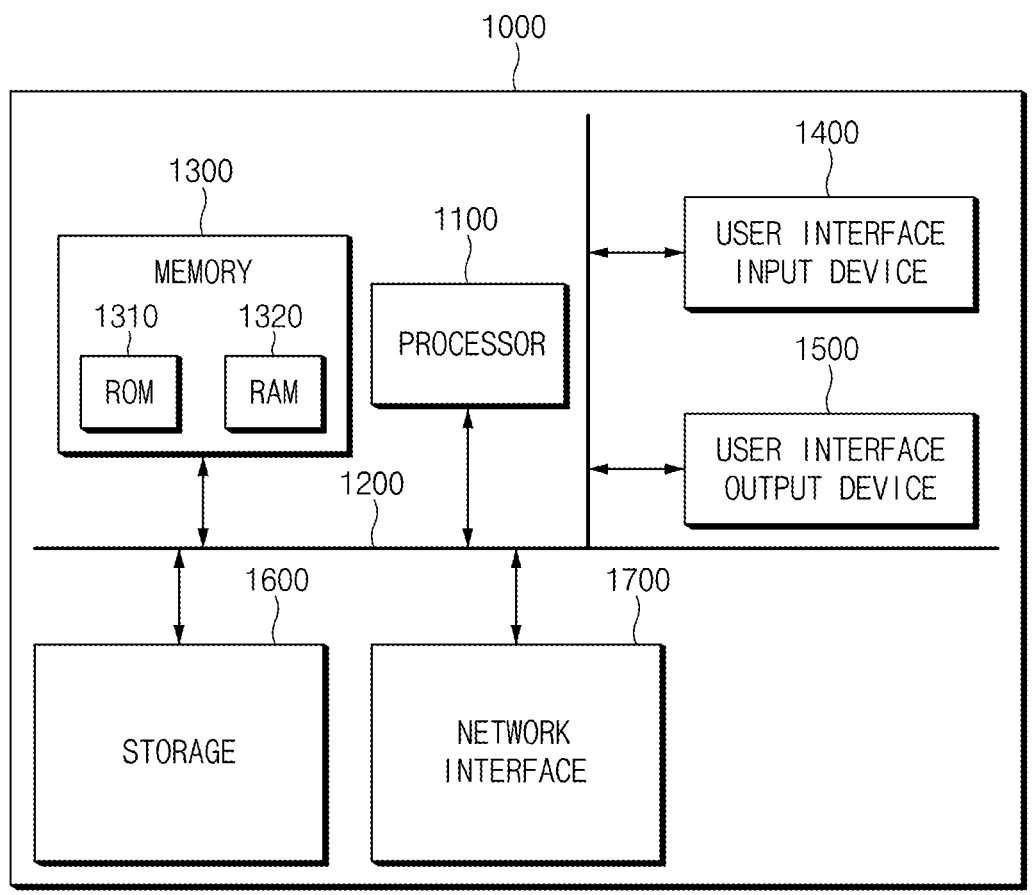
FIG. 16 is a block diagram illustrating a computer system according to a form of the present disclosure.

FIG. 16 is a block diagram illustrating a computer system according to a form of the present disclosure.

Referring to FIG. 16, a computing system 1000 may include at least one processor 1100, a memory 1300, a user interface input device 1400, a user interface output device 1500, storage 1600, and a network interface 1700, which are connected to each other through a bus 1200.

The processor 1100 may be a central processing unit (CPU) or a semiconductor device which performs processing for instructions stored in the memory 1300 and/or the storage 1600. The memory 1300 and the storage 1600 may include various types of volatile or non-volatile storage media. For example, the memory 1300 may include a read only memory (ROM) and a random access memory (RAM).

The operations of a method or algorithm described in connection with the forms disclosed herein may be incorporated directly in hardware, in a software module executed by the processor 1100, or in a combination of the two. The software module may reside in a storage medium (that is, the memory 1300 and/or the storage 1600) such as a random access memory (RAM), a flash memory, a read only memory (ROM), an erasable programmable ROM (EPROM), an electrically erasable programmable ROM (EEPROM), registers, hard disk, a removable disk, a compact disc-ROM (CD-ROM), etc.

An exemplary storage medium is coupled to the processor 1100 such that the processor 1100 may read information from, and write information to, the storage medium. Alternatively, the storage medium may be integrated into the processor 1100. The processor and the storage medium may reside in an ASIC. The ASIC may reside within a user terminal. Alternatively, the processor and the storage medium may reside in the user terminal as individual components.

According to the present technology, it is possible to detect whether an intruder who intrudes into a vehicle before, after or while a user gets in the vehicle is present and inform the user of the fact, thereby assuring safety of the user and safety of the vehicle. In addition, various effects that are directly or indirectly understood through the present disclosure may be provided.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirt and scope of the present disclosure.

What is claimed is:

1. An apparatus for managing a vehicle intrusion, the apparatus comprising:
a processor configured to determine presence of an unauthorized occupant who intrudes into a vehicle after or while a user of the vehicle gets in the vehicle, and to notify the user of the presence of the unauthorized occupant who intrudes into the vehicle, wherein the unauthorized occupant is sensed by a sensing module;

storage configured to store a result of detecting the presence of the unauthorized occupant obtained by the processor; and
a display configured to be controlled by the processor and output a notification screen when the processor determines the presence of the unauthorized occupant after the user gets in the vehicle.

2. The apparatus of claim 1, further comprising:
a communication device configured to be controlled by the processor and transmit a notification text to a user terminal of the user when the processor determines that the unauthorized occupant who intrudes into the vehicle is present before the user gets in the vehicle.

3. The apparatus of claim 1, wherein the display is configured to display whether the unauthorized occupant who intrudes into the vehicle exists together with in-vehicle location information of the unauthorized occupant who intrudes into the vehicle.

4. The apparatus of claim 1, wherein the processor is configured to control an external lamp or a horn of the vehicle to perform a notification to the user when the presence of the unauthorized occupant who intrudes into the vehicle before the user gets in the vehicle is detected.

5. The apparatus of claim 4, wherein the processor is configured to control the external lamp to illuminate in one direction based on a location of the unauthorized occupant who intrudes into the vehicle.

6. The apparatus of claim 4, wherein the processor is configured to control the external lamp of the vehicle to be lightened on at a bright intensity or to be flickered or turned on or off in a preset pattern when the user is away from the vehicle by a preset distance or more, when an ambient light exists, or when the vehicle is located at an outdoor place.

7. The apparatus of claim 4, wherein the processor is configured to control the external lamp of the vehicle to be turned on at a dark intensity or to be flickered or turned on or off in a preset pattern when the user is located within a preset distance from the vehicle, when an ambient light is dark, or when the vehicle is located at an indoor place.

8. The apparatus of claim 4, wherein the external lamp includes at least one of a head lamp, a fog light, a tail light, a brake light, an emergency light, a room lamp, a daytime headlight, a welcome lamp, and a vehicle side light.

9. The apparatus of claim 1, wherein the processor is configured to inform the user by using at least one of an in-vehicle mood lamp, the display, and seat vibration when the intrusion of the unauthorized occupant occurs after the user gets in the vehicle.

10. The apparatus of claim 9, wherein the processor is configured to:
inform of whether the unauthorized occupant who intrudes into the vehicle is present or a location of the unauthorized occupant as a lighting position or lighting color of the in-vehicle mood lamp;
display whether the unauthorized occupant who intrudes into the vehicle is present or the location of the unauthorized occupant on the display to inform the user; or
inform of whether the unauthorized occupant who intrudes into the vehicle exists or the location of the unauthorized occupant as a vibration position or vibration intensity of a seat of the user.

11. The apparatus of claim 1, wherein the processor is configured to sense a change in a location of the unauthorized occupant after a door of the vehicle is opened to determine whether the unauthorized occupant who intrudes into the vehicle is present.

12. The apparatus of claim 1, wherein the processor is configured to:
register information about at least one person in the storage in advance;
compare image information or volumetric information obtained by photographing at least one occupant including the unauthorized occupant who sits on a rear seat of the vehicle with information about the at least one person registered in advance to perform a notification to the user when the image information or volumetric information does not correspond to the information about the at least one person registered in advance; and
perform a notification to the user when a number of the at least one occupant sitting on the rear seat of the vehicle is greater than or less than a number of the at least one person stored in advance.

13. A system for managing a vehicle intrusion comprising:
a sensing module configured to sense presence of an unauthorized occupant who intrudes into a vehicle;
a vehicle intrusion management apparatus configured to determine the presence of the unauthorized occupant who intrudes into the vehicle after or while a user of the vehicle gets in the vehicle, based on a sensing result of the sensing module, and further configured to inform the user of the presence of the unauthorized occupant who intrudes into the vehicle; and
a user terminal configured to receive a notification text indicating the presence of the unauthorized occupant who intrudes into the vehicle from the vehicle intrusion management apparatus when the presence of the unauthorized occupant who intrudes into the vehicle before the user gets in the vehicle is determined,
wherein the vehicle intrusion management apparatus is configured to output a notification screen on an in-vehicle display of the vehicle when the presence of the unauthorized occupant after the user gets in the vehicle is determined.

14. The system of claim 13, wherein the user terminal is configured to display at least one piece of information about whether the unauthorized occupant who intrudes into the vehicle is present, position information of the unauthorized occupant who intrudes into the vehicle, and a number of occupants on the in-vehicle display, and output at least one of sound, vibration, and lamp.

15. The system of claim 13, wherein the user terminal includes at least one state indicating lamp, and
wherein the user terminal is configured to control whether to turn on the at least one state indicating lamp or a flickering pattern of the at least one state indicating lamp to indicate at least one piece of information about whether the unauthorized occupant who intrudes into the vehicle is present, position information of the unauthorized occupant who intrudes into the vehicle, and a number of occupants present inside the vehicle.

16. The system of claim 13, wherein the sensing module includes:
a door sensor configured to sense opening or closing of a door of the vehicle;
a radar sensor configured to be controlled by the vehicle intrusion management apparatus, to be activated when the door is closed after being opened, and to sense whether the unauthorized occupant is present in an interior of the vehicle; and
a camera configured to photograph the unauthorized occupant in the interior of the vehicle.

17. A method of managing a vehicle intrusion, the method comprising:
- sensing presence of an unauthorized occupant who intrudes into a vehicle after or while a user of the vehicle gets in the vehicle;
- determining whether the unauthorized occupant who intrudes into the vehicle is present based on a sensing result; and
- informing the user of the presence of the unauthorized occupant who intrudes into the vehicle,
- wherein informing the user of the presence of the unauthorized occupant includes: outputting a notification screen to an in-vehicle display of the vehicle when the presence of the unauthorized occupant exists after the user gets in the vehicle.

18. The method of claim 17, wherein informing the user of the presence of the unauthorized occupant includes:
- transmitting a notification text informing of the presence of the unauthorized occupant who intrudes into the vehicle to a user terminal when the presence of the unauthorized occupant who intrudes into the vehicle is sensed before the user gets in the vehicle; and
- controlling an external lamp or a horn of the vehicle to inform the user.

19. The method of claim 17, wherein informing the user of the presence of the unauthorized occupant includes:
- informing the user by using at least one of an in-vehicle mood lamp, or seat vibration of the vehicle when the intrusion of the unauthorized occupant occurs after the user gets in the vehicle.

* * * * *